Nov. 20, 1928.

J. FOLK 1,692,336

GRIPPING DEVICE FOR SLICING MACHINES

Filed April 23, 1927    2 Sheets-Sheet 1

Inventor
Joseph Folk
By Nissen & Crane
Attys

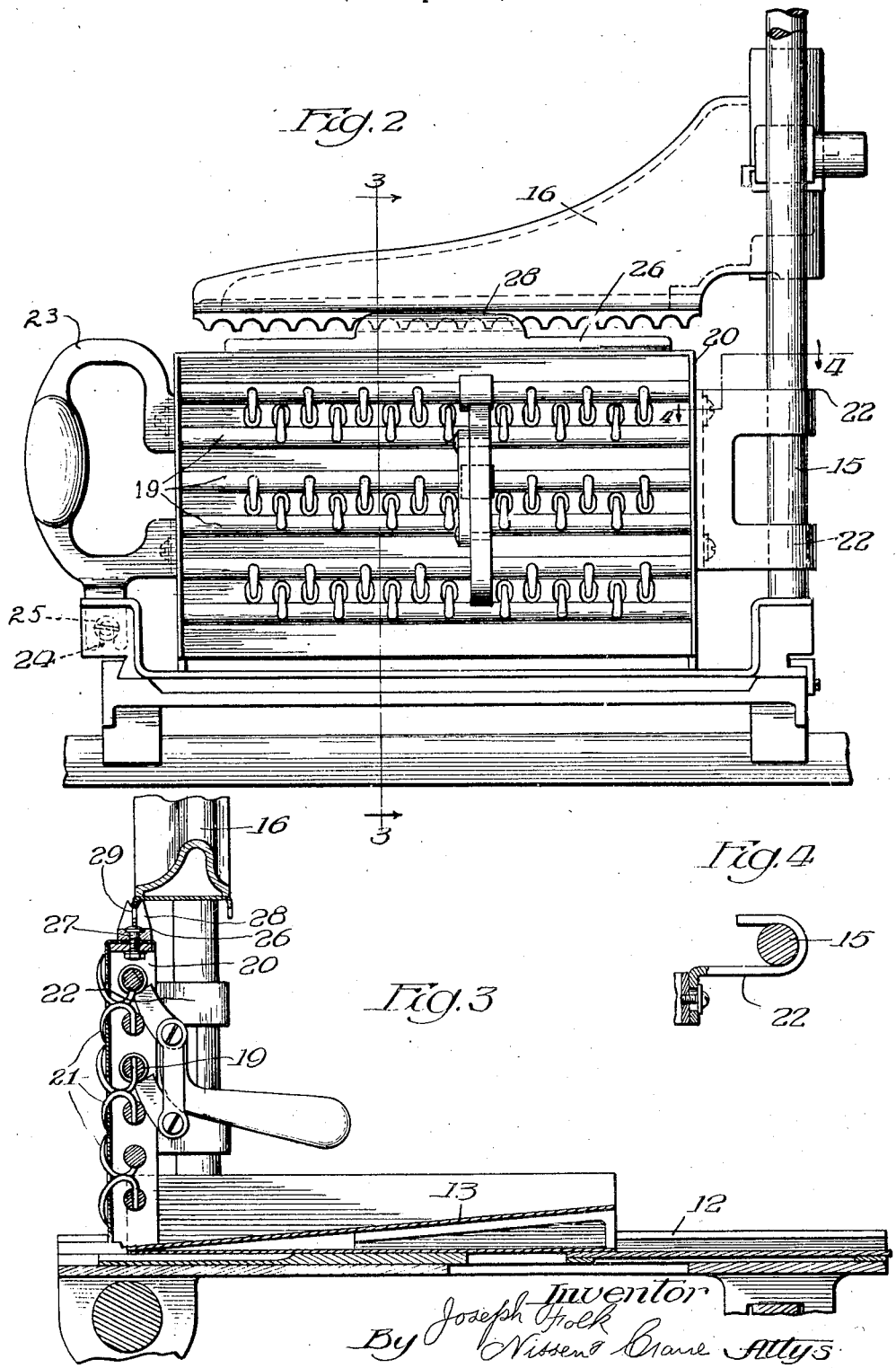

Patented Nov. 20, 1928.

1,692,336

UNITED STATES PATENT OFFICE.

JOSEPH FOLK, OF LA PORTE, INDIANA, ASSIGNOR TO U. S. SLICING MACHINE COMPANY, OF LA PORTE, INDIANA, A CORPORATION OF INDIANA.

GRIPPING DEVICE FOR SLICING MACHINES.

Application filed April 23, 1927. Serial No. 185,948.

This invention relates to means for holding the material on the work support of a slicing machine while it is being sliced, and has for one of its objects the provision of improved means for mounting an end grip on the work support.

A further object of the invention is to provide mechanism of the class named which shall be of improved construction and convenient to operate.

Other objects will appear from the following description.

The invention is exemplified in the combination and arrangement of parts shown in the accompanying drawings and described in the following specification, and it is more particularly pointed out in the appended claims.

In the drawings—

Fig. 2 is a rear elevation of the work support shown in Fig. 3;

Fig. 3 is a section on line 3—3 of Fig. 2; and

Fig. 4 is a fragmentary section on line 4—4 of Fig. 2.

Figure 1:
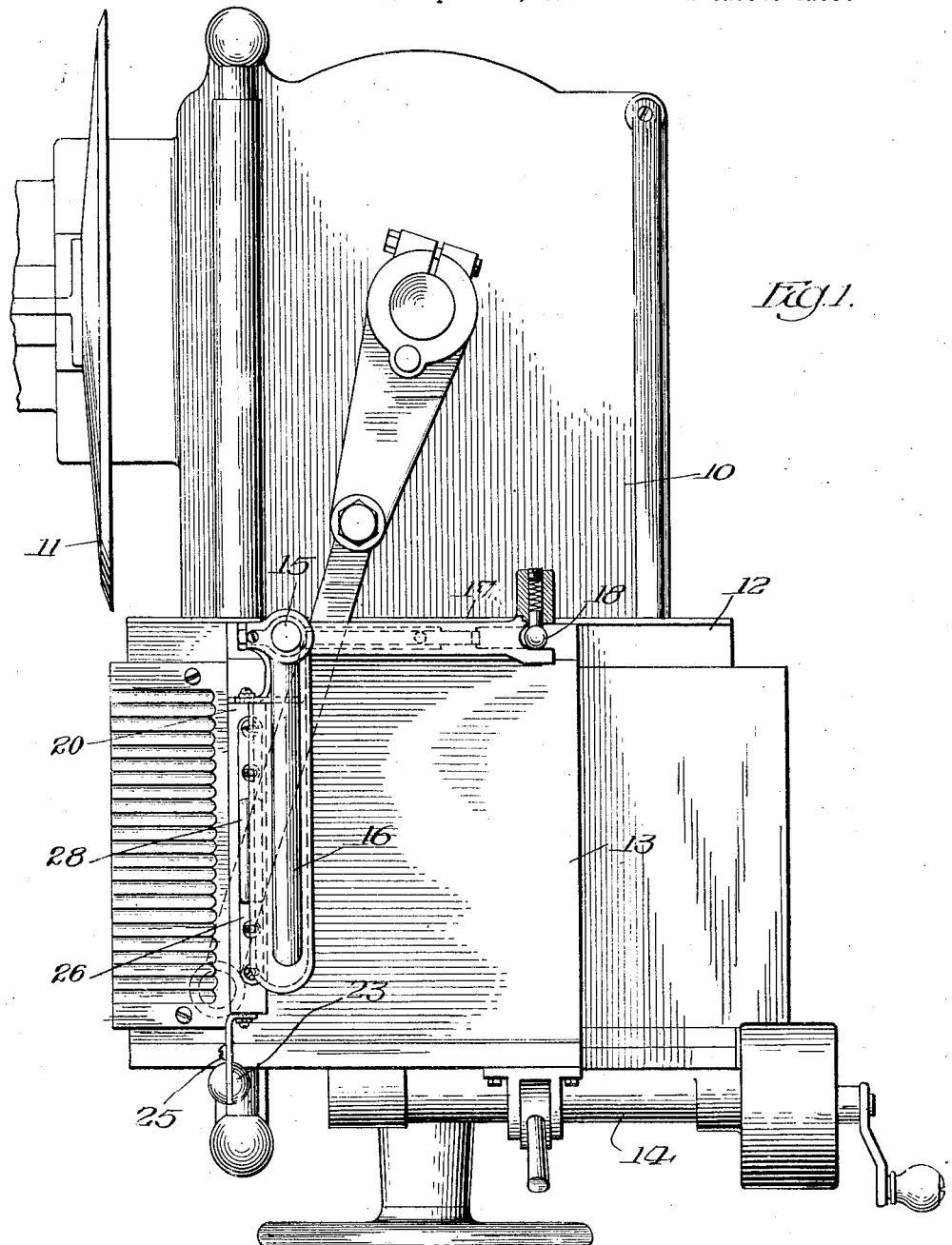
Fig. 1 is a top plan view of a slicing machine showing one embodiment of the present invention applied thereto.

The invention is illustrated as applied to the form of a slicing machine having a base 10 provided with a rotary slicing knife 11 and a reciprocating carriage 12. A meat support 13 is mounted to slide on the carriage 12 and is provided with feed mechanism 14 by which it is intermittently moved toward the cutting plane of the slicing knife in a manner well known in the art. An upright 15 is mounted at the side of the meat support 13 opposite the operator's position and a top grip 16 is mounted to slide vertically on the upright 15. A rearwardly extending arm 17 is rigid with the top grip 16 and engages an upright 18 adjacent the rear edge of the support 13. The top grip 16 is supported entirely by the uprights 15 and 18 and is provided with mechanism for holding it against upward movement on the uprights 15 and 18.

An end grip comprising bars 19 mounted in a frame 20 and carrying grippers 21 is provided with hooks 22 for engaging the upright 15. This end grip may be of any suitable construction, the form shown being similar to that covered by Patent No. 1,356,165, granted October 19, 1920. A handle 23 is secured to the end of the frame 20 opposite the hooks 22 and is provided with a slot 24 open at its lower side for engaging a headed screw 25 secured to the front edge of the meat support 13. A rest 26 is secured to the top of the frame 20 by bolts 27 and is provided with upstanding lips 28 spaced apart to form a groove 29 for receiving the front row of teeth which project downwardly from the top grip 16. In this way the top grip is held in its elevated position during the use of the end grip and the end grip is braced by the top grip so that it is firmly supported in position for slicing meat ends.

The form of top grip illustrated does not require an upright at the side of the work support adjacent the operator so that there is nothing projecting upwardly from the work table to support the upper portion of the end grip at the operator's side of the work table. The top rest 26 is thus employed to serve the double function of supporting the top grip 16 out of the way of the end grip and also co-operating with the top grip for bracing the upper portion of the end grip so that it is held firmly in position. A firm support for the meat end grip is necessary in order to insure uniform thickness of slices.

The screw holes for attaching the member 26, the hooks 22 and the handle 23 to the frame 20 are elongated to permit slight adjustment of the end grip toward and away from the cutting plane of the knife in order that it may be set so that the prongs 21 will just clear the knife when the work support has been fed to the limit of its forward movement.

I claim:—

1. A work holder for slicing machines comprising a work support, an upright mounted on said work support at one side thereof, a top grip slidably mounted on said upright, an end grip attached to said upright, and means on the top of said end grip for engaging said top grip to hold said end grip in place on said work support.

2. A work holder for slicing machines comprising a work support, an upright mounted on said work support adjacent one edge thereof, a top grip slidably mounted on said upright and projecting across said work support, means for holding said top grip against horizontal rotation on said upright, an end grip having means at one end for engaging said upright, and means having a recess therein for receiving the gripping portion of said top grip to brace said end grip in position on said work support.

3. A work holder for slicing machines comprising, a work support, an upright at the side of said work support opposite the side adjacent the operator's side, the side of said work support adjacent the operator's side being substantially unobstructed, an end grip having means thereon for engaging said upright at one end of said end grip, a top grip slidable on said upright and adapted to engage said end grip, and means at the opposite end of said end grip for engaging said work support adjacent the lower edge of said end grip to hold said end grip on said work support.

4. A work holder for slicing machines comprising a work support having an upright at one side thereof adjacent the front edge of said work support, an end grip having means secured to one end thereof for engaging said upright, means on the opposite edge of said end grip adjacent the bottom edge thereof for engaging the front portion of said work support, and means for engaging the top of said end grip for bracing said end grip on said work support.

5. A work holder for slicing machines comprising a work support, an upright at one side of said work support adjacent the front edge thereof, a top grip slidably mounted on said upright and having a downwardly projecting gripping portion, means for holding said top grip against horizontal rotation on said upright, an end grip having means on one end thereof for releasably engaging said upright, a bracket on the opposite end of said end grip near the bottom thereof for releasably engaging the front portion of said work support, and a rest on the top of said end grip having a recess therein for receiving the gripping portion of said top grip to brace said end grip in position on said work support.

6. In a slicing machine, a slicing knife, a work support, means for feeding said work support toward said slicing knife, a top grip mounted on said work support, an end grip on said work support, said top grip being vertically adjustable independent of said end grip and adapted when moved in one position to hold said end grip in position, a handle secured to said end grip, and means secured to said handle for engaging said work support to hold said end grip in position.

7. In a slicing machine, a work holder comprising a work support, an end grip mounted in upright position on said work support, a top grip adjustable to and from said work support independently of said end grip, said top grip being formed to co-operate when in lowered position with said end grip to brace and hold said end grip in position on said work support.

8. In a slicing machine, a work holder comprising a work support, an end grip mounted in upright position on said work support, a post extending upwardly from said work support adjacent one end of said end grip, a top grip vertically adjustable on said post independent of said end grip, said top grip projecting laterally from said support and adapted when in lowered position to engage and brace said end grip.

In testimony whereof I have signed my name to this specification on this 18th day of April, A. D. 1927.

JOSEPH FOLK.